United States Patent [19]

Citino

[11] Patent Number: 5,573,292
[45] Date of Patent: Nov. 12, 1996

[54] COMBINATION TURNER/STRAINER KITCHEN UTENSIL

[76] Inventor: Salvatore Citino, 1013 Sampler Way, Potomac, Md. 20854

[21] Appl. No.: 366,424

[22] Filed: Dec. 29, 1994

Related U.S. Application Data

[63] Continuation of Ser. No. 929,528, Aug. 14, 1992, abandoned, which is a continuation-in-part of Ser. No. 717,809, Jun. 19, 1991, abandoned.

[51] Int. Cl.[6] .................................. A47J 43/28
[52] U.S. Cl. .................................. 294/7; 30/325
[58] Field of Search .................. 294/7, 8, 49, 55; 209/417, 418, 419; 30/324, 325; 210/470, 471; D7/667, 691, 692

[56] References Cited

U.S. PATENT DOCUMENTS

| | | | |
|---|---|---|---|
| 46,416 | 9/1914 | Selleck . | |
| D. 54,303 | 12/1919 | Berger | D7/691 |
| D. 120,610 | 5/1940 | Berge | D7/691 |
| D. 161,224 | 12/1950 | Wendling | 30/324 X |
| D. 190,879 | 7/1961 | Kessler | D7/667 |
| 783,235 | 2/1905 | Argersinger | 210/470 |
| 827,101 | 7/1906 | Hutchins . | |
| 902,954 | 11/1908 | Felty . | |
| 1,228,821 | 6/1917 | Reynolds | 294/7 |
| 1,452,464 | 4/1923 | Isaacs | 294/7 |
| 1,592,698 | 7/1926 | Hudson | 294/8 |
| 1,969,162 | 8/1934 | Smith | 294/7 X |
| 2,141,223 | 12/1938 | Pistorius | 294/7 |
| 3,788,484 | 1/1974 | Godin | 210/470 |
| 4,587,734 | 5/1986 | Jonsson et al. . | |
| 4,904,009 | 2/1990 | Kozlinski . | |

FOREIGN PATENT DOCUMENTS

| | | | |
|---|---|---|---|
| 11909 | 3/1896 | France | 30/325 |
| 518035 | 2/1940 | United Kingdom . | |

OTHER PUBLICATIONS

Fox Run Craftsmen, 1989 Catalog, pp. 1–3 and 52.

*Primary Examiner*—Dean Kramer
*Attorney, Agent, or Firm*—Nixon & Vanderhye, P.C.

[57] ABSTRACT

A dual-purpose spatula-skimmer kitchen utensil provides a rigid, planar surface having a thin leading edge for being pushed beneath a food product (e.g., cooking within a shallow frying pan or the like). A depression or concavity in the planar surface has perforations or holes therethrough which permit liquid to flow but trap small food particles. In a further embodiment, the depression is ramped and has substantially flat upper and lower surfaces. The utensil may be used for skimming and/or straining cooking liquids (e.g., to filter food particles suspended in oil used in frying), and also for flipping or turning food products.

2 Claims, 5 Drawing Sheets

COMBINATION TURNER/STRAINER KITCHEN UTENSIL

CROSS-REFERENCES TO RELATED APPLICATIONS

This application is a continuation of application Ser. No. 07/929,528 filed 14 Aug. 1992, now abandoned; which is a continuation-in-part of application Ser. No. 07/717,809 filed 19 Jun. 1991 now abandoned.

FIELD OF THE INVENTION

This invention relates to kitchen utensils, and more particularly to spatula like utensils for use in cooking food in a shallow pan such as a frying pan. Still more specifically, the present invention relates to a spatula/skimmer kitchen utensil which provides dual uses of flipping food products and straining the cooking liquid in which the food products are being cooked. Still more particularly, the present invention relates to a kitchen utensil which combines the functions of a skimmer/strainer (e.g. for removing scum and tiny food particles from a cooking medium such as oil or water) with the functions of a turner/spatula (e.g., for turning, flipping and/or searing foods).

BACKGROUND AND SUMMARY OF THE INVENTION

In the process of preparing food by pan frying, it is typically necessary to flip or turn the frying food products to ensure even cooking on both (or all) sides. Typically, a slotted or perforated spatula or "turner" is used to provide such a flipping action. Such spatulas or turners are available in a wide variety of different configurations.

For example, one type of commonly-available turner includes a plastic handle connected by an elongated stainless steel rod to a broad, roughly rectangular, slotted blade portion. The blade portion comprises a substantially planar, thin rectangular sheet of stainless steel, for example. The blade portion includes plural, parallel elongated slots which extend for most of the length of the blade portion and are oriented in the direction of the handle. These slots permit cooking oil or other cooking liquid adhering to the food products to drain back into the pan as the cook removes the food products from the pan. Similarly configured "turners" may be molded from one-piece high temperature plastic, and may include similar multiple elongated slots oriented in the direction to the handle.

Another type of spatula-like kitchen utensil may provide, instead of elongated slots, a plurality of circular holes of varying sizes. These holes similarly have the function of permitting oil or other liquids to drain from food products as the cook suspends the utensil (and the food products resting thereon) above the pan.

An important feature of these types of spatula and turner utensils is that the blade has a relatively sharp and thin "leading edge", (and the blade forms an appropriate angle with respect to the handle) such that it is relatively easy for the cook to push the blade beneath a food product resting on the bottom of a shallow pan (e.g., a frying pan). In use, the cook places the blade leading edge beneath an edge of a food product, and pushes the blade beneath the food product (at the same time, the cook may naturally move the handle in a slight downward direction such that the blade becomes more or less parallel with the bottom of the pan). Because of the relative flatness of the blade, the blade can be pushed beneath the food product without damaging the food product outer surface.

The cook then lifts the utensil away from the pan (such that the blade and the food product resting thereon is suspended above the pan). Liquid (e.g., cooking oil) adhering to the outer surface of the food product drains back into the pan through the slots or perforations in the blade. The cook may "flip" the food product back into the pan (to place an uncooked surface of the food product into contact with the bottom of the pan, for example), or may remove the food product from the pan.

As mentioned above, such spatulas or turners are capable of draining oil or other liquids from food products. However, the slots or holes provided in the blades of such utensils are relatively large, and therefore pass food particles suspended in the cooking liquid in addition to the cooking liquid. Thus, such utensils cannot be used to strain or filter fine food particles from the cooking liquid.

So-called "pot drainers" are also known. One exemplary prior art pot drainer comprises a planar sheet of wood having an elongated handle portion and a wider blade portion (with the shape of the wooden sheet being shaped like the paddle portion of ping-pong paddle if such ping-pong paddle were cut lengthwise down its center in the handle direction). The wider blade portion has regularly-spaced holes drilled therethrough to permit liquid to drain. Such "pot drainers" are useful for draining foods (e.g., boiled vegetables) by retaining the foods while permitting the water or other cooking medium to drain off back into the pot. However, such "pot drainers" cannot be used for straining the cooking medium because of its configuration and/or the relatively large size of the holes used.

Figures 5, 5A:
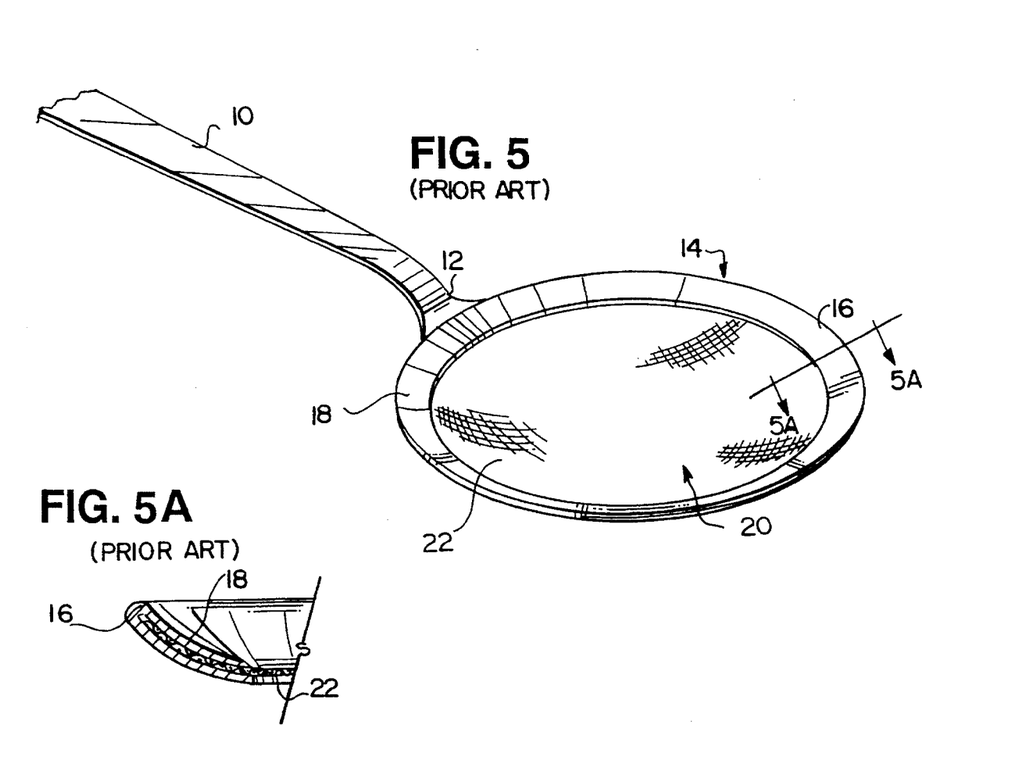
FIG. 5 is an elevated perspective view of an exemplary prior art skimmer utensil.
FIG. 5A is a side, cross-sectional view of an inwardly curved peripheral ring portion of the FIG. 5 prior art skimmer.

A type of kitchen utensil which may be used for draining food products and also for filtering or straining cooking liquid is called a "skimmer." Such skimmers come in a variety of different configurations. One type of prior art skimmer is illustrated in FIGS. 5 and 5A. This exemplary prior art skimmer includes an elongated handle member 10 attached at an end 12 (e.g., by a spot weld) to a circular skimming member 14. Skimming member 14 has a circular-shape outer peripheral ring 16 providing an inwardly curved upper surface 18 (see FIG. 5A). Ring 16 defines a circular hole 20 at the center thereof, and suspends a fine stainless steel screen or mesh 22 across the circular hole. FIG. 5A shows a detailed cross-section of how ring member 16 is bent over to seal and grasp the edge of screen 22. Screen 22 thus defines most of the upper surface area provided by skimmer member 14. Screen 22 has an overall concave shape (as can be seen in FIG. 5), and provides holes or perforations of a relatively small size. Screen 22 traps fine food particles in the concavity within the screen, but permits liquid to freely drain through the screen. This type of skimmer may be used to drain food products (e.g., boiled vegetables). Some cooks may possibly also use this type of skimmer (e.g., because of its fine mesh) to filter or strain cooking liquids (e.g., to remove food particles from the oil of a deep fat fryer).

Another known skimmer configuration provides a circularly-shaped skimmer member, but instead of screen 22, there is provided a one-piece stainless steel sheet the entirety of which has been stamped into a concave shape. Multiple, evenly-spaced holes or perforations are punched through the sheet. Still another style of skimmer may be more spoon-like in configuration—with the skimmer member meeting the handle at an obtuse angle (e.g., in a manner somewhat similar to a ladle).

While such skimmers and "pot drainers" are quite useful for draining food products and/or removing food particles from cooking liquids, it is not practical to use them to flip or turn food products in a shallow pan. Many such skimmers are intended to be used with relatively large (e.g., 4 quart and larger) pans, and are simply too large to be used with most fry pans. Moreover, such skimmers do not provide a thin, flat leading edge that can easily be pushed beneath food products in a shallow pan. Because of the curved outer peripheral edges of such skimmers, any attempt to use the skimmer as a spatula would result in damage to the outer surface of the cooked food products.

The following additional prior art may be relevant:

Great Britain 518,035;

U.S. Pat. No. 46,416;

U.S. Pat. No. 902,954;

U.S. Pat. No. 4,587,734;

U.S. Pat. No. 827,101;

U.S. Pat. No. 4,904,009; and

Fox Run Craftsmen, 1989 Catalog pages 1–3 and 52.

British Patent No. 518,035 discloses a "combined egg or fish slice, strainer and spoon" kitchen utensil intended "for removing an egg or any article of food such as a piece of fish from the frying pan" and "adapted also to serve as a strainer to allow water, fat or other liquid in which the article was cooked, to drain away." While the British disclosure uses the term "straining", it is apparent from the Figures and the disclosure as a whole that the device is intended and useful for draining, not straining. The disclosure discusses draining (e.g., "to allow water, fat or other liquid in which the article was cooked, to drain away") but does not suggest straining of the cooking liquid to trap small food particles while permitting the cooking liquid to pass. The disclosed device includes a spoon formed with an extending flat blade with the cup of the spoon being perforated or made of wire gauze so as to serve as a drainer. The holes 4 of the embodiment shown in FIGS. 1–2 of the reference are relatively large—permitting rapid draining of cooking liquids from food (e.g., fish or egg) resting within the cup of the spoon. However, such a configuration with these relatively large holes is incapable of straining or filtering the cooking liquid so as to trap small food particles while permitting the cooking liquid to pass. Even assuming that the size of the mesh of the embodiment shown in the FIGS. 3–4 were suitable for straining, the relatively large degree of concavity of the cupped portion of the FIG. 3 embodiment would prevent the utensil from effectively being used as either a turner/flipper or as a cooking liquid strainer.

Thus, none of the prior art kitchen utensils discussed above are particularly well adapted (or useful) for the dual uses of: (a) turning or flipping pan-frying food products; and (b) filtering or straining the cooking liquid in which such food products are being cooked.

One of the problems with pan frying is that carbonized food particles tend to build up at the bottom of the pan. For example, when frying breaded foods (e.g., eggplant, chicken, veal, etc.) in hot oil in an open shallow fry pan, some of the breading tends to fall off of the food products as cooking progresses. This breading builds up in the bottom of the pan (close to the heat).

When frying a large volume of individual pieces (i.e., more than a single pan full), it is desirable to reuse the hot oil (i.e., by simply removing fully cooked food products from the pan and replacing them with raw food products to be cooked). After one or more pan-fulls of food products have been cooked, however, the built-up breading particles at the bottom of the pan have been heated so long that they carbonize. The cooking food products in the pan rest on (and are thus in direct contact with) such carbonized food particles, such that the carbonized particles adversely affect the flavor (and possibly even the cooking time) of the food products.

As mentioned above, the cook typically uses a spatula or other substantially flat or planar utensil to periodically flip or turn the frying food products. Although such conventional spatulas or turners can possibly be used to scrape off some of the food particles built up in the bottom of the pan, a large number of particles will flow through the slots or holes in the blade and end up back in the pan.

The present invention, in contrast, provides a kitchen utensil which can be used to flip food products cooking in a frying pan; and to also to strain food particles from a cooking liquid.

In accordance with one aspect of the present invention, a cooking utensil is provided having an elongated handle member. A food contacting member is fixed to an end of the handle. This food contacting member defines a concave straining surface and at least one adjacent, substantially planar food supporting surface. The food supporting surface preferably has a thin leading edge that is adapted to be pushed beneath food products.

In accordance with a further aspect of this invention, the food contacting member defines a center and at least a leading edge. A substantially planar surface is defined adjacent to the edge. The food contacting member further defines a straining surface providing a concave portion at or near the center of the food contacting member. This straining surface has holes or perforations therethrough, these holes or perforations being of a size such that, in use, liquid can pass through the holes or perforations but food particles become trapped in the straining surface concave portion so as to strain the cooking liquid.

In one embodiment provided by the present invention, the straining surface is defined by a screen member bonded or otherwise affixed to another member (e.g., a flat sheet) which defines the planar surface. In a further embodiment, the straining surface comprises a pressed or stamped portion of a planar sheet defining the planar surface, and holes or perforations are punched into the pressed or stamped portion so as to define a concave trap area for trapping food particles and the like.

BRIEF DESCRIPTION OF THE DRAWINGS

These and other features and advantages of the present invention will be better and more completely understood by referring to the following detailed description of presently preferred exemplary embodiments in conjunction with the sheets of Figures, of which.

DETAILED DESCRIPTION OF PRESENTLY PREFERRED EXEMPLARY EMBODIMENTS

Figure 1:
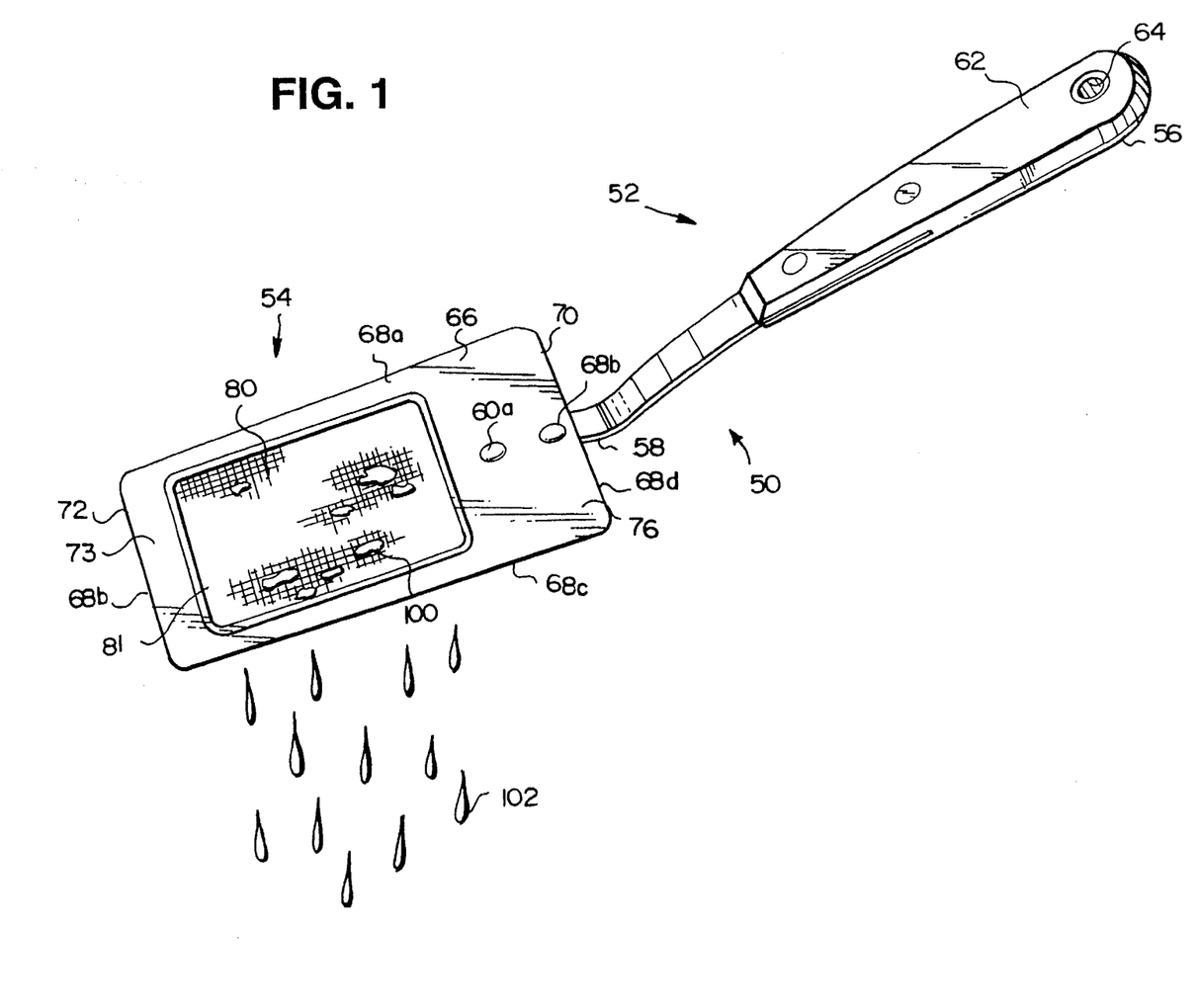
FIG. 1 is an elevated perspective view of a present preferred exemplary embodiment of a combination spatula-skimmer kitchen utensil provided by the present invention, this embodiment including a screen or mesh straining surface.

FIG. 1 is an elevated perspective view of a presently preferred exemplary embodiment of a combination spatula-skimmer kitchen utensil 50 provided by the present invention. Utensil 50 includes an elongated handle portion 52 and a relatively flat blade or spatula portion (hereafter referred to as "blade") 54. Handle portion 52 includes a grasping end 56 and a further end 58. Further end 58 is preferably fixedly bonded to blade 54 (e.g., using rivets 60 or other similar, conventional fastening structure). Handle grasping end 56 is designed to be grasped by a human hand. For example, grasping end 56 may preferably be provided with a heat-insulative covering 62 such as a bonded wooden hand grip or the like (or handle 52 may be composed of thermally conductive materials or otherwise be configured or designed in a conventional manner) so that the handle grasping end does not become too hot to grasp. Grasping end 56 may include a hole 64 or other similar arrangement for permitting utensil 50 to be hung on a hook.

Blade 54 in the preferred embodiment includes a substantially planar, thin, metallic (e.g., stainless steel) sheet 66 which defines four peripheral edges 68a–68d. Each of edges 68a–68d is thin and relatively sharp in the preferred embodiment. Sheet 66 may have dimensions that are identical to those of the blade of a standard, conventional spatula or turner. Thus, for example, blade member 54 may be wider at an end 70 closest to handle 52 than its width at a far end 72 if desired. Sheet 66 is preferably semi-rigid, and is made of a relatively thin nontoxic, durable material (e.g., a sheet of stainless steel or heat resistant plastic).

Figure 2:
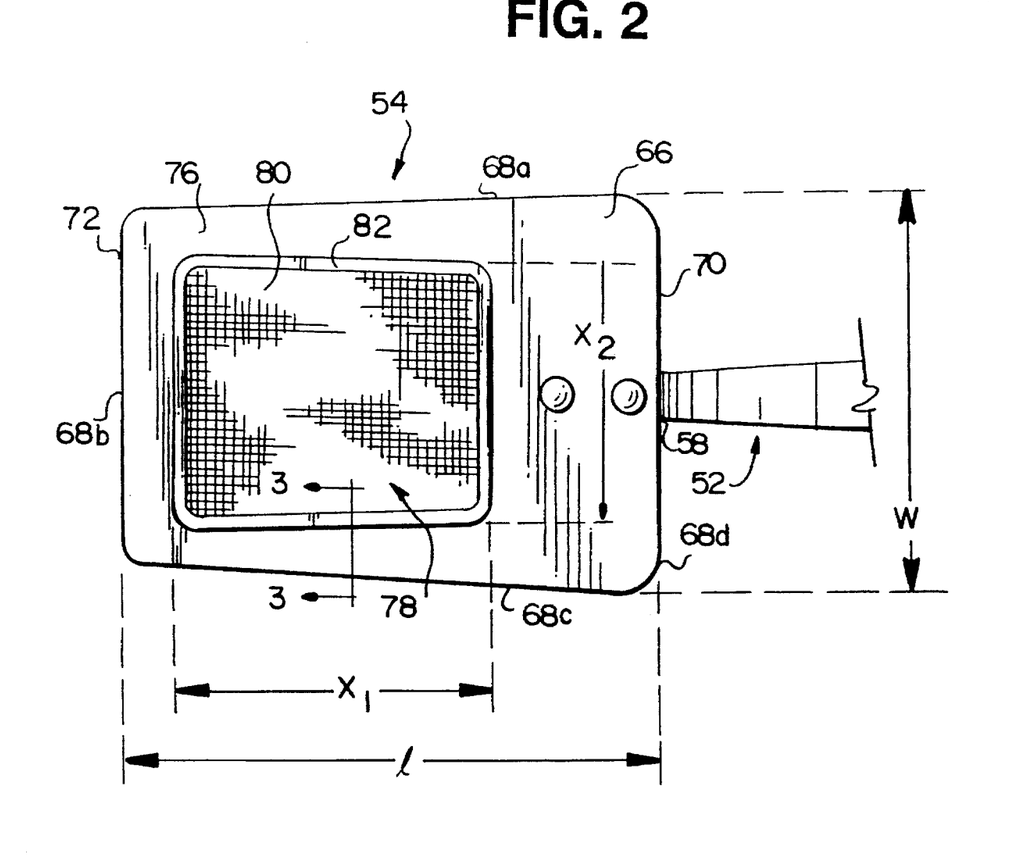
FIG. 2 is a detailed top view in plan of the blade portion of the FIG. 1 embodiment.

In the preferred embodiment, a leading edge 68b at sheet far end 72 (i.e., the edge of the sheet which is the furthest from handle further end 58) is thin and relatively sharp (although not necessarily sharpened to a point). Given the substantial flatness and semi-rigidity of the sheet surface 73 which is immediately adjacent edge 68b, this leading edge 68b may easily be pushed beneath a food product in a shallow pan without damaging the food product. As shown in FIG. 2, sheet 66 may, for example, have a length 1 of approximately 4.5 inches; and a width w near handle further end 58 of approximately 3.25 inches (the width of the sheet at leading edge 68b may be less than w, for example, 2.75 inches). The total surface area provided by blade upper surface 76 may thus be on the order of approximately 13.5 square inches in one exemplary preferred embodiment.

Figure 3:
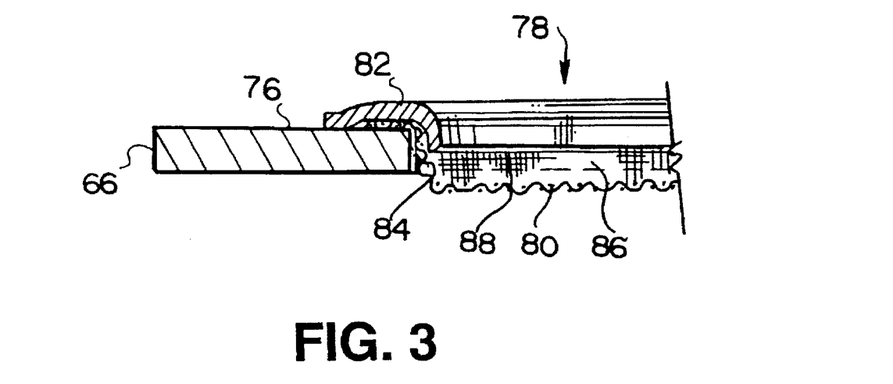
FIG. 3 is a side view in cross-section, taken along line 3—3 of FIG. 2, of the embodiment shown in FIGS. 1 and 2.

Referring now to FIGS. 1–3, sheet 66 in the preferred embodiment has, cut out of its center, a substantially rectangular hole or void 78. In the preferred embodiment, this hole or void 78 may be rectangular and have dimensions of, for example, $x_1$ equal approximately 2.5 inches and $x_2$ equal approximately 1.75 inches. A fine screen or mesh 80 is bonded (or otherwise fastened) to span across rectangular hole 78. Thus, screen 80 defines a straining surface 81 in the preferred embodiment having an upper surface area of about 4.375 square inches. In the preferred embodiment, for example, screen 80 may be bonded to sheet 66 with a metallic rim border fastener 82 which may be pressed (e.g., using a conventional stamping machine or the like) into edges 84 defining hole 80 (see FIG. 3). Border fastener 82 may, for example, be made of a rigid, thin non-corrosive stainless steel or the like. Border fastener 82 firmly adheres screen member 80 to sheet 66 such that there is no gap or void between hole edges 84 and the screen member.

In accordance with an important feature of one aspect of the present invention, screen 80 defines a concavity with respect to the upper surface 76 of sheet 66. For example, screen 80 may, along one of its extents, define a concave curve (see FIG. 3), with the concavity extending downward with respect to the surface 76. The concavity provided by screen 80 forms a "trap" or "catch" volume 86. The distance from a bottom-extending portion 88 of screen 80 to sheet upper surface 76 may be on the order of 1/8th of an inch in one preferred embodiment (although it may range in the preferred embodiment from 1/16th of an inch to 3/16ths of an inch, for example) to define a trap volume having a size of approximately 0.75 cubic inches (2.5 inches by 1.75 inches by 0.175 inches, for example) and providing a straining surface area of about 4⅜ square inches in the illustrated embodiment. Thus, the surface area provided by screen 80 in the preferred embodiment is on the order of 4/13ths (less than half) of the total surface area provided by the upper surface 76 of blade 54.

Screen 80 comprises, in this preferred embodiment, a stainless steel wire mesh having holes 90 defined therethrough. The gauge and spacing (e.g., 1/16 of an inch center-to-center) of the individual wires or other filaments making up screen 80 in the preferred embodiment is such that even relatively viscous liquids (e.g., hot cooking oil) can readily pass through the screen mesh. However, small food particles cannot pass through screen 80, and instead become trapped within the concave "trap" volume 86 shown in FIG. 3. Thus, for example, as shown in FIG. 1, relatively small food particles 100 are trapped by screen 80, whereas cooking liquids (e.g., oil) 102 readily flows through the screen 80.

Referring once again to FIG. 1, the substantially flat upper surface 76 of sheet 66 is sufficiently rigid and has a sufficiently large surface area (e.g., 9/13ths of the total upper surface area provided by blade 54) such that good support is provided for massive food products (e.g., pieces of fried chicken or the like). Thus, spatula member 54 can be used to flip or turn such food pieces, and may also be used to drain grease or other liquid from such food pieces (since any liquid dripping from the food pieces readily passes through screen 80 away from the food product and into the pan beneath).

Utensil 50, however, has the additional use of straining cooking liquids. As used herein, the term "strain" means to hold back or trap small particles while permitting liquid to pass so as to filter the liquid. As illustrated in FIG. 1, relatively small food products are trapped within trap volume 86 defined by screen 80. Thus, leading edge 68b of utensil 50 can be used to scrape food particles from the bottom of a fry pan and into the catch volume 86. Cooking liquid (e.g., cooking oil) also within the catch volume 86 will pass through screen 80 and out of the catch volume when blade 54 is lifted from the cooking liquid. As the cooking liquid passes through screen 80, small food particles formerly suspended in the cooking liquid and/or scraped into the catch volume 86 become trapped in the catch volume because of the relatively fine screen mesh. The trapped particles can be discarded by turning blade over (e.g., over a suitable receptacle) to permit the particles to fall out of the catch volume.

Thus, in the preferred embodiment, straining surface 81 strains the cooking liquid by holding back or trapping small food particles while permitting the cooking liquid to pass therethrough so as to filter the cooking liquid. Straining surface 81 also may permit draining of cooking liquids from food products supported by sheet 66 by permitting liquid to drain away from the food products supported thereby. Depending upon the rigidity and the shape of the food products (and the spacing of screen 80 from sheet upper surface 76), the screen may also support food products resting on blade 54.

Figure 4:
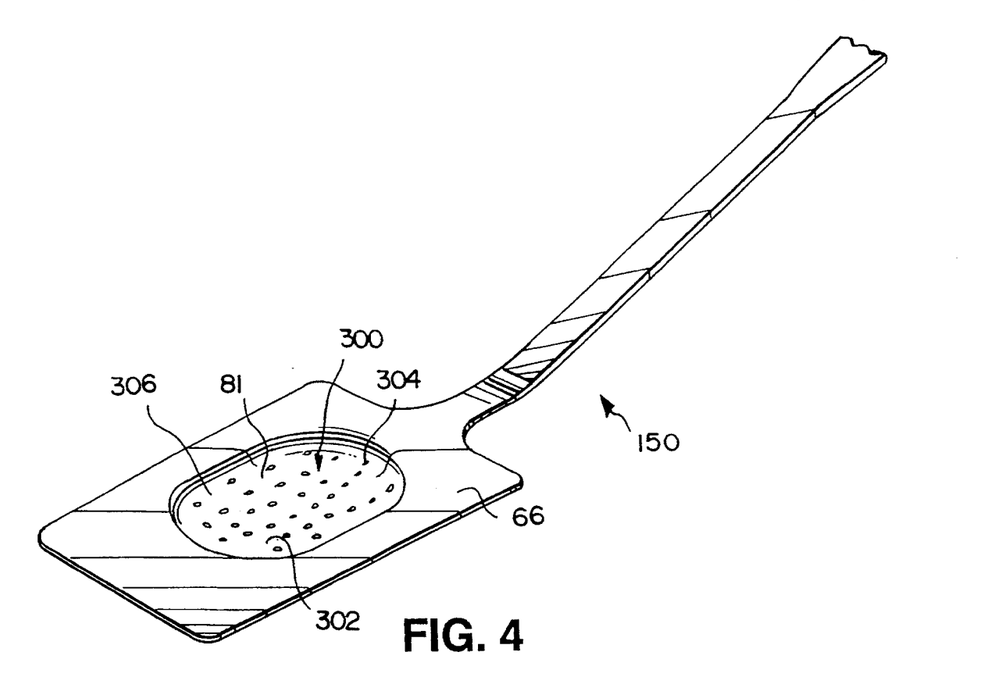
FIG. 4 is an elevated perspective view of a further embodiment provided by the present invention, this further embodiment including a stamped, punched straining surface having perforations or holes therethrough.

FIG. 4 shows a further embodiment of a spatula/skimmer utensil 150 provided by the present invention. In the FIG. 4 embodiment, straining surface 81 is provided by a depression 300 pressed into sheet 66. In the preferred embodiment, such depression 300 may be elliptical in shape as shown, and may have dimensions of approximately 2" wide×2½" long, and a depth of on the order of ¼ inch or so. Depression 300 is perforated with punched or drilled (preferably regularly-spaced) holes 304 to permit straining of cooking liquids. Utensil 150 thus provides, like the FIG. 1 embodiment 50, a trap or catch volume 306 within depression 300 which can easily trap or catch food particles and the like so as to facilitate filtering or cleaning of liquids within a shallow pan.

Figure 6:
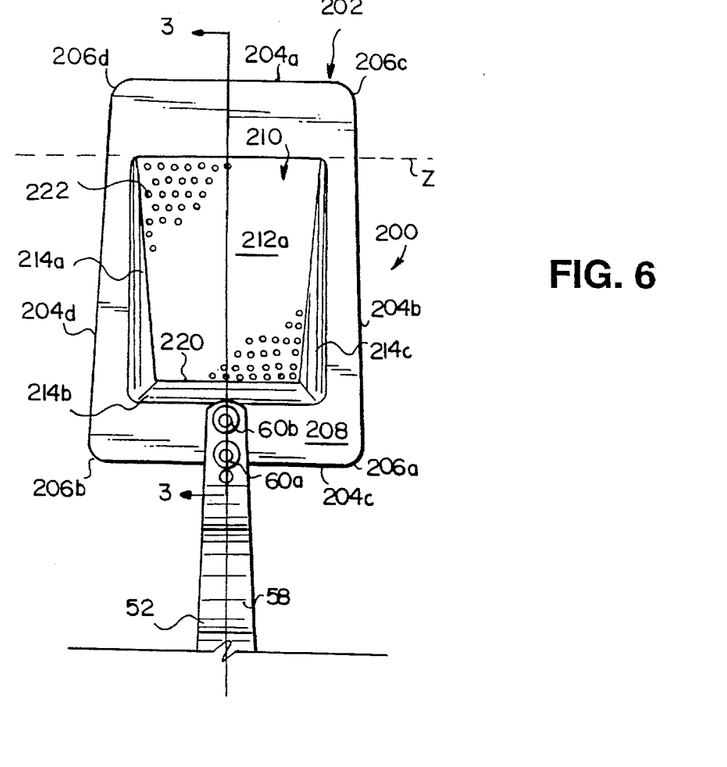
FIG. 6 is a top view in plan of a further presently preferred exemplary embodiment of a combination turner/strainer provided by the present invention.
Figure 7:
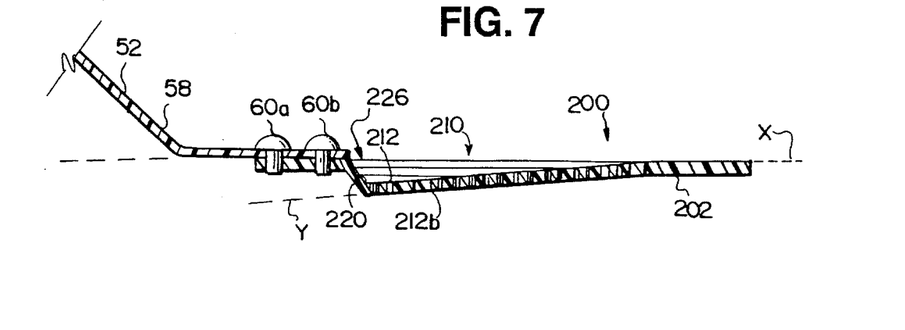
FIG. 7 is a side view in cross-section of the embodiment shown in FIG. 6.

FIGS. 6 and 7 depict a further presently preferred exemplary embodiment of a combination turner/strainer kitchen utensil 200 provided by the present invention. Referring to FIG. 6, utensil 200 includes a blade member 202 which may be made of stainless steel, plastic (as shown in FIG. 7), or any other suitable material providing appropriate rigidity and heat-resistant properties. In the preferred embodiment, blade member 202 is rectangular in shape and has four edges 204a–204d that meet one another in curved corner portions 206a–206d. In the preferred embodiment, side edges 204b and 204d are of the same length; handle portion 52 is attached to the blade member 202 at or near rear edge 204c; and front leading edge 204a (an edge opposite and parallel to rear edge 204c in the preferred embodiment) is shorter than the rear edge such that the side edges each make an acute angle with the rear edge and each make an obtuse angle with the front edge.

Figure 8:
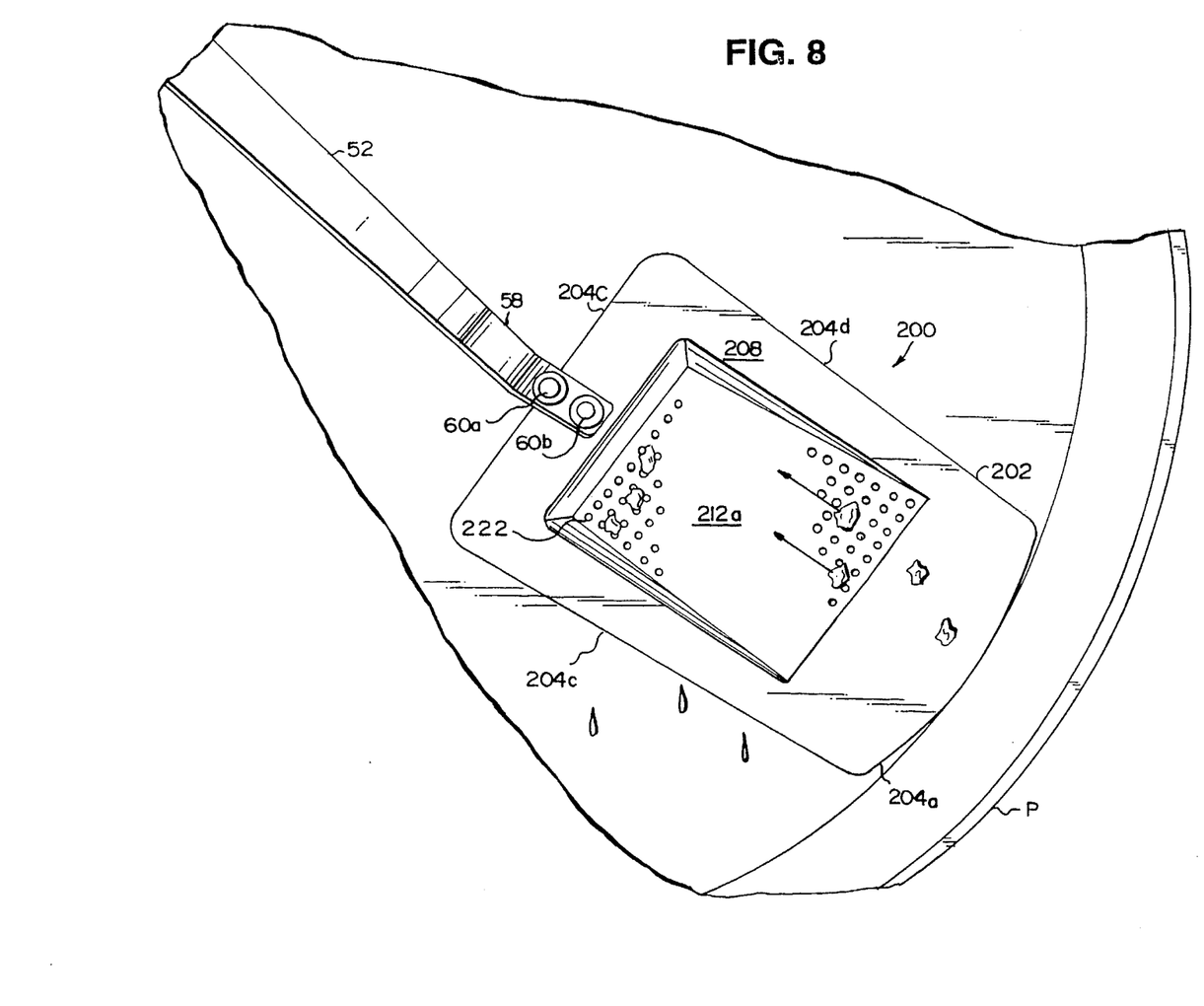
FIG. 8 is a top perspective view of a still further presently preferred exemplary embodiment of a combination turner/strainer provided by the present invention.

Blade member 202 may be attached to handle portion 52 with rivets 60 or any other convenient fastening technique (e.g., integral fabrication with handle portion 52). Front leading edge 204a is relatively thin and rigid such that it can easily be pushed beneath a food product resting in a shallow pan, for example (see FIG. 8). Front leading edge 204a may be straight (as shown in FIG. 6), or in another embodiment (as shown in FIG. 8) the front leading edge is slightly curved or arced so as to permit the leading edge to conform with the curved outer wall of a typical shallow cooking pan in order to permit easy access to all portions of the pan.

Blade member 202 defines an upper, substantially flat food supporting surface 208 lying within a plane X (see FIG. 7). In the preferred embodiment, a shallow inclined trough or depression 210 is defined within the approximate center of blade member 202 such that the trough is surrounded by the food supporting surface 208. Trough 210 includes a bottom portion 212 that is substantially rigid and includes an upper surface 212a and a lower surface 212b (see FIG. 7). Bottom portion upper surface 212a is preferably substantially flat, and defines the bottom of trough 210. Bottom portion lower surface 212b is also preferably substantially flat and provides a flat resting surface (often in direct contact with the bottom of a pan when utensil 200 is in use) on which blade member 200 may rest and be supported.

As can be most clearly seen in FIG. 7, the trough bottom portion upper surface 212a is ramped or inclined downward in the preferred embodiment. Bottom portion lower surface 212b defines a plane Y that intersects plane X at a line Z (see FIGS. 6 and 7) parallel to both blade member rear edge 204c and blade member front leading edge 204a. In the preferred embodiment, plane X and plane Y intersect one another in a relatively small acute angle (e.g., <10 degrees). Because of this relatively small angle of incline, the depth of trough 210 at its deepest part (near rear edge 204c) is relatively small (e.g., on the order of about ¼ of an inch). Hence, even with trough 210, blade member 202 has a small profile such that is can easily be pushed beneath food products within a pan (see FIG. 8) or the like in order to turn or flip the food products.

Trough 210 in the preferred embodiment serves the important function of collecting, catching and retaining small food particles (e.g., carbonized bits of breading or the like). As can be seen in FIGS. 6 and 7, trough 210 has zero depth at the line labelled "Z". Moving down the "ramped" or inclined surface 212a formed by trough 210 from line Z and progressing away from blade member front edge 204a toward blade member rear edge 204b, surface 212a gradually descends downward and away in a ramped manner relative to the plane "X" of food supporting surface 208. As mentioned above, in the preferred embodiment the rearmost portion 220 of bottom portion upper surface 212a is approximately ¼ inch below the plane X level of surrounding food supporting surface 208 (referring to the orientation shown in FIG. 7). Blade member 202 is preferably of one-piece construction, with trough bottom portion 212 connected to food supporting surface 208 by angled side walls 214a and 214c and an angled rear wall 214b all preferably formed in one fabrication process through stamping or the like.

Trough bottom portion 212 in the preferred embodiment is perforated over substantially its entire surface area with openings 222 of relatively small size (e.g., circular holes having diameters mostly within the range of about ¹⁄₃₂ inches to about ³⁄₁₆ inches). The sizes and spacings of openings 222 are chosen to provide optimal straining capabilities. Openings 222 are large and numerous enough to permit viscous cooking liquid such as oil to easily pass therethrough, but small enough to trap (prevent passage of) relatively small food particles such as carbonized breading particles. Openings 222 may preferably be formed in the same stamping operation used to press out trough 210. In the embodiment shown in FIG. 6, there are approximately 15–20 rows of holes with about 10–15 holes in each row for a total of approximately 200 holes.

As shown more particularly in FIG. 9, trough 210 retains fine particles within a trapping volume 226 defined in the space between trough bottom portion upper surface 212a and the plane "X" of surrounding food supporting surface 208.

When using utensil 200 as a strainer or skimmer, the cook immerses blade member 202 into the cooking liquid and then preferably manipulates handle 52 so as to lift the blade member and at the same time push the blade member forward. This action causes cooking liquid and particles suspended therein to be pushed into trough 210. The liquid easily passes through openings 222, but suspended particles (e.g, carbonized or other loose food particles, scum floating on the cooking liquid surface, etc.) are pushed into the trapping volume 226 defined by trough 210 and become trapped therein. As mentioned above, openings 222 are relatively fine such that most food particles of significant size are collected and trapped by trough 210. The approximately ¼ inch depth of trough 210 and the ramped configuration of the trough allows for the capture of particles from several iterations of such "forward and lifting" motions without undue escape of captured particles. Moreover, the ¼ inch depth of trough 210 at its deepest point tends to retain larger food particles that might otherwise tend to slip off of blade member 202. The particle trapping action of trough 210 may be enhanced by the flow of cooking liquid down into the inclined trough 210 and through openings 222 (and additionally particles may slide down the ramped trough bottom surface 212a due to the slipperiness of cooking liquids such as oil). During such a "forward and lifting" motion, the front leading edge 204a of blade member 202 may simultaneously be used to scrape the bottom of the pan so as to loosen additional food particles for removal. The cook may periodically lift blade member 202 completely out of the cooking liquid and invert the blade member over a waste receptacle in order to remove the trapped particles from the trapping volume 226 and discard the particles.

During use of cooking utensil 200 as a turner/flipper, thin front leading edge 204a is typically inserted beneath an edge of a cooking food portion to be turned; and then the blade member 202 is pushed beneath the food portion such that the food portion is mostly supported by food supporting surface 208. Because the trough bottom portion lower surface 212b is substantially flat, it can be placed in direct contact with the bottom of the pan P (see FIG. 8) without scratching the pan and substantially without interfering with the insertion of blade member 202 beneath the food portion. Moreover, due to the ramped configuration of trough 210, the blade member food supporting surface 208 gently ramps upward toward the food product when flat trough bottom portion lower surface 212b is disposed in direct contact with the flat bottom of a shallow frying pan P or the like—thereby assisting in the insertion of blade member 202 beneath the cooking food product. As the cook further inserts blade member 202 beneath the food portion, the food portion slides upward along food supporting surface 208 (and may also partially rest on at least the portion of trough bottom portion upper surface 212a near front leading edge 204a). The cook may then lift and turn the entire blade member 202 and supporting food product so as to flip the food product such that its other side can be exposed to the heat source. It has been found that even non-rigid, large food products such as pancakes can be easily turned by utensil 200 due to the ramped configuration of trough 210, the flatness of trough bottom surface 212b, and the low profile of the blade member 202.

In addition, the rigid, substantially flat bottom surface 212b of blade member 202 may be used for a further purpose of pressing down on cooking foods (e.g., so as to aid in searing of steaks, chops and hamburgers).

A particularly useful, multi-purpose kitchen utensil has been described which is capable of turning food products and is also capable of straining and skimming cooking liquids so as to remove small food particles and/or floating scum from cooking liquids and thereby filter the cooking liquid. The utensil provides a relatively flat blade having a substantially rigid upper surface. The blade provides a relatively thin, leading edge such that it (the leading edge and the blade) can be pushed beneath a food product and used to lift and turn the food product. In addition, a depression region (e.g., defined by a downwardly ramped trough, for example) is provided at or near the center of the blade for trapping small food particles while permitting liquids to pass. This trap or depression region does not interfere with the use of the utensil for flipping or turning, but facilitates straining of cooking liquids. In the inclined trough embodiment, the upper and lower surfaces of the trough are substantially flat and the entire blade member has a thin profile so as to provide more effective turning/flipping.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A combination strainer/turner including a thin, substantially flat blade means having a front leading edge, said blade means for flipping large food pieces, an inclined trough means being formed in said blade means, plural small openings being defined within said trough means, said trough means for trapping tiny food particles while allowing cooking liquid to pass through and escape, wherein said trough means includes a substantially flat bottom surface having small holes substantially evenly distributed thereover.

2. A combination spatula/skimmer kitchen utensil including a substantially flat blade member having a thin front edge portion that in use can be pushed under food items to lift and turn said food items, said blade member including a recessed portion defining a substantially flat inclined surface, said inclined surface having many small perforations therethrough, said perforations being substantially evenly distributed over substantially said entire inclined surface, said recessed portion in use capturing food particles while allowing liquid to drain through said perforations and escape said recessed portion.

* * * * *